(12) United States Patent
Beeson et al.

(10) Patent No.: US 6,738,543 B1
(45) Date of Patent: May 18, 2004

(54) HITLESS TUNABLE WAVELENGTH FILTERS

(75) Inventors: Karl W. Beeson, Princeton, NJ (US); Lawrence W. Shacklette, Maplewood, NJ (US); Manish Sharma, Princeton, NJ (US); Han Zou, Windsor, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 119 days.

(21) Appl. No.: 10/160,383

(22) Filed: May 30, 2002

(51) Int. Cl.[7] ............................................. G02B 6/26
(52) U.S. Cl. ............................ 385/27; 385/10; 385/16; 385/37
(58) Field of Search ........................ 385/2, 8–10, 15–23, 385/27, 37, 40–42

(56) References Cited

U.S. PATENT DOCUMENTS

| | | |
|---|---|---|
| 4,807,950 A | 2/1989 | Glenn et al. |
| 5,077,816 A | 12/1991 | Glomb et al. |
| 5,493,390 A | 2/1996 | Varasi et al. |
| 5,574,807 A | 11/1996 | Snitzer |
| 5,636,309 A | 6/1997 | Henry et al. |
| 5,812,709 A * | 9/1998 | Arai et al. ................. 385/16 |
| 5,818,986 A | 10/1998 | Asawa et al. |
| 5,850,498 A | 12/1998 | Shacklette et al. |
| 5,982,791 A * | 11/1999 | Sorin et al. .................. 372/25 |
| 6,020,986 A | 2/2000 | Ball |
| 6,023,545 A | 2/2000 | Eldada et al. |
| 6,035,080 A * | 3/2000 | Henry et al. ................. 385/24 |
| 6,069,985 A | 5/2000 | Albin et al. |
| 6,091,870 A | 7/2000 | Eldada |
| 6,162,579 A | 12/2000 | Stengel et al. |
| 6,181,676 B1 | 1/2001 | Yao et al. |
| 6,215,918 B1 * | 4/2001 | Keil et al. ................... 385/16 |
| 6,219,474 B1 | 4/2001 | Cai et al. |
| 6,246,809 B1 * | 6/2001 | Jouanno et al. .............. 385/22 |
| 6,269,200 B1 | 7/2001 | Wickham et al. |
| 6,306,563 B1 | 10/2001 | Xu et al. |
| 6,317,526 B1 | 11/2001 | Shirasaki et al. |
| 6,335,149 B1 | 1/2002 | Xu et al. |

* cited by examiner

Primary Examiner—Phan T. H. Palmer
Assistant Examiner—Jennifer Doan (57) ABSTRACT

A hitless wavelength selective optical device includes a first thermo-optic switch (TOS), a second TOS, a first waveguide, a second waveguide, a third waveguide, a heating element and a control unit. The first TOS includes receives a wavelength division multiplexed (WDM) signal at a first port of the first TOS. The second TOS provides at least one channel of the WDM signal at a first port of the second TOS. The first waveguide is coupled between second ports of the first and second TOS. The second waveguide includes a tunable filter that reflects a selected channel from the received WDM signal and coupled between the third ports of the first and second TOS.

31 Claims, 6 Drawing Sheets

HITLESS TUNABLE WAVELENGTH FILTERS

BACKGROUND OF THE INVENTION

1. Field of the Invention

The present invention relates to tunable wavelength filters and, more specifically, to hitless tunable wavelength filters. A hitless tunable wavelength filter is a filter that can be tuned from a first wavelength to a second non-adjacent wavelength without affecting (reflecting or distorting) any of the through-channel transmitted wavelengths and without introducing any switching transients in the transmitted wavelengths.

2. Technical Background

Tunable filters, e.g. fiber Bragg gratings (FBGs), have been utilized in a number of optical systems to selectively add and/or drop wavelengths (i.e., channels) at appropriate locations in wavelength division multiplexed (WDM) optical systems. As is well known to one of ordinary skill in art, a tunable FBG is a narrow band reflective element which can be tuned on or off an International Telecommunications Union (ITU) standard wavelength such that the wavelength may be reflected by or transmitted through the FBG. In this manner, FBGs act as selectable notch band stop filters which substantially reflect received signals within a range of wavelengths and which substantially pass signals which are not within the range of wavelengths. An ideal FBG reflects one signal and passes the remaining signals substantially unattenuated.

In a typical optical system, the addition or subtraction of an optical signal channel (i.e., a specific wavelength) has been achieved by a controller, which controls a given FBG between one of a transmissive and a reflective state. In such a system, there has typically been a FBG for each channel of the WDM signal and the FBGs have been actuated between a transmissive and reflective state in a number of ways. For example, the period of the fiber Bragg grating may be changed by applying a physical stress to the fiber through the use of an actuator, such as a piezoelectric device. In this manner, adjusting the power applied to the piezoelectric device, via a controller, causes the range of wavelengths reflected by the grating to change.

Alternatively, the effective refractive index of the fiber Bragg grating may be thermally tuned such that the wavelength reflected by the grating varies with temperature. In this manner, the temperature of each grating is adjusted by applying an appropriate amount of power to a heater, which is typically made from an electrically resistive coating that is in thermal contact with the grating. In such systems, the gratings have typically been calibrated such that a given grating reflects a given wavelength at a given temperature. However, in such systems, the ability to switch a grating from one wavelength to another in a hitless manner is limited. In the case of a glass fiber grating, both the ability to stretch the fiber and to change its refractive index with temperature is limited. It is difficult to tune a FBG in a hitless manner from a first wavelength to a second non-adjacent wavelength without affecting intermediate channels. There can also be limitations to switching (tuning) speeds. In temperature controlled systems, the switching speed limitation has generally been attributable to a grating associated thermocouple, which is located near the grating to sense the grating temperature. A controller, coupled to the thermocouple, monitors the temperature reported by the thermocouple and adjusts the power delivered to an associated heater accordingly. However, the temperature reported by the thermocouple typically differs, at least after an initial change, from the temperature of the heater. As such, the controller may overshoot or undershoot a desired heater temperature multiple times before stabilizing on a desired temperature and, thus, experience difficulty in locking onto a desired wavelength and may cause switching transients within the optical system.

What is needed is a practical closed-loop control system that is capable of maintaining a tunable wavelength filter locked to a desired wavelength. It would also be desirable for the system to be able to switch the tunable wavelength filter from one wavelength to another wavelength in a reliable relatively efficient hitless manner, covering a wide range of wavelengths and performing the wavelength shift in an acceptably short period of time.

SUMMARY OF THE INVENTION

One embodiment of the present invention is directed to a wavelength selective optical device that includes a first thermo-optic switch (TOS), a second TOS, a first waveguide, a second waveguide, a third waveguide, a heating element and a control unit. The first TOS includes a first, second and third port and the first port of the first TOS receives a wavelength division multiplexed (WDM) signal. The second TOS includes a first, second and third port and the first port of the second TOS provides at least one channel of the WDM signal. The first waveguide is coupled between the second ports of the first TOS and the second TOS. The second waveguide includes a tunable filter formed in the second waveguide that reflects a selected channel from the received WDM signal and is coupled between the third ports of the first TOS and the second TOS. The third waveguide includes a reference filter formed in the third waveguide that receives a reference signal and provides an indication signal. The heating element is in thermal contact with the tunable filter and the reference filter. The control unit is coupled to the heating element, the first TOS and the second TOS and varies a temperature of the heating element responsive to the indication signal provided by the reference filter to adjust the selected channel of the tunable filter. The control unit also controls the switching of the first TOS and the second TOS such that the received WDM signal is routed through the first waveguide when the temperature of the heating element is adjusted.

An alternative embodiment of the present invention is directed to a wavelength selective optical device that includes a first thermo-optic switch (TOS), a second TOS, a first waveguide, a second waveguide, a heating element and a control unit. The first TOS includes a first, second and third port and the first port of the first TOS receives a wavelength division multiplexed (WDM) signal. The second TOS includes a first, second and third port and the first port of the second TOS provides at least one channel of the WDM signal. The first waveguide is coupled between the second ports of the first TOS and the second TOS. The second waveguide includes a tunable filter formed in the second waveguide that reflects a selected channel from the received WDM signal and is coupled between the third ports of the first TOS and the second TOS. In addition, the second waveguide includes a reference filter formed in the second waveguide that receives a reference signal and provides an indication signal. The heating element is in thermal contact with the tunable filter and the reference filter. The control unit is coupled to the heating element, the first TOS and the second TOS and varies a temperature of the heating element responsive to the indication signal provided by the reference filter to adjust the selected channel of the tunable filter. The control unit also controls the switching of the first TOS and the second TOS such that the received WDM signal is routed through the first waveguide when the temperature of the heating element is adjusted.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their descriptions, serve to explain the principals and operation of the invention.

DETAILED DESCRIPTION OF THE PREFERRED EMBODIMENTS

According to one embodiment of the present invention, a number of hitless wavelength selective optical devices are described that include a first thermo-optic switch (TOS), a second TOS, a first waveguide, a second waveguide, a third waveguide, a filter heating element and a control unit. The first thermo-optic switch (TOS) includes a first, second and third port and the first TOS receives a wavelength division multiplexed (WDM) signal at the first port. The second TOS includes a first, second and third port and the first port of the second TOS provides at least one channel of the WDM signal. The first waveguide is coupled between the second ports of the first TOS and the second TOS. The second waveguide includes a tunable filter formed in the second waveguide that reflects a selected channel from the received WDM signal and is coupled between the third ports of the first TOS and the second TOS. The third waveguide includes a reference filter formed in the third waveguide that receives a reference signal and provides an indication signal.

The filter heating element is in thermal contact with the tunable filter and the reference filter. The control unit is coupled to the filter heating element as well as the heating elements of the first TOS and the second TOS and varies the temperature of the filter heating element responsive to the indication signal provided by the reference filter to adjust the selected channel of the tunable filter. The heating elements of the thermo-optic switches are formed in a conventional manner, e.g., an electrically resistive coating is deposited onto the appropriate portions of the switch waveguides. The filter heating element may be either a bulk heater or a cooler, e.g. a thermoelectric cooler, or may be a thin film resistive coating. The control unit controls the switching of the first TOS and the second TOS such that the received WDM signal is routed through the first waveguide when the temperature of the heating element is adjusted. The wavelength selective device is hitless in that there are no switching transients nor optical losses during the switching process as the WDM signal bypasses the tunable filter during the time that the tunable filter is changing from one wavelength to another.

In this invention, it is generally advantageous for the thermo-optic switches to be digitally controlled. Examples of such digital switch designs are known in the art as Y-branch digital optical switches (YDOS) and X-branch digital optical switches (XDOS).

As used herein the term "control unit" may include, for example, a microcontroller, a microprocessor with associated memory and peripherals, a field programmable gate array (FPGA), a programmable logic array (PLA) or a switching array. As is also used herein, the term "tunable filter" may take a wide variety of forms, e.g., a tunable Bragg grating. The reference filter in the third wave guide may be, for example, a tunable Bragg grating or may be one arm of a waveguide Mach-Zehnder interferometer. It should be appreciated that the systems disclosed herein that only drop signals can be readily modified in order to add signals delivered to an optical data receiver. For example, by coupling two ports of an add circulator between an output of a main waveguide and an optical data receiver, with the remaining port of the add circulator receiving an add signal from an add data source, such systems can function as an add/drop multiplexer (ADM).

The first, second and third waveguides of this invention may, for example, be planar waveguides. Typical examples of such waveguides are channel and rib waveguides. A particularly preferred form of a planar waveguide is the buried channel waveguide. A preferred form of the buried channel waveguide comprises a single-mode optical waveguide fabricated on a substrate, the substrate defining a surface with a buffer layer disposed on the surface of the substrate having an index of refraction $n_b$. A thin undercladding layer is formed on the surface of the buffer layer, with the undercladding layer defining a surface and having an index of refraction layer $n_u$. A light-transmissive single-mode core is on the surface of the undercladding layer and the core defines a top surface and sidewalls and has an index of refraction $n_c$. An overcladding layer is on the top surface of the core and on the sidewalls of the core and on a portion of the undercladding layer and has an index of refraction $n_o$. The core index of refraction $n_c$ is greater than the index of refraction of the overcladding layer $n_o$ and is also greater than the index of refraction of the undercladding layer $n_u$. In the waveguide, $\Delta n = n_c - n_o$ and typically $n_u \approx n_o$, and the difference between $n_c$ and the index of refraction of the buffer $n_b$ is at least about 1.5 times $\Delta n$, and the value of $\Delta n$, in combination with the dimensions of the core, are such that they produce a single-mode waveguide at optical communication wavelengths.

Materials of construction for the waveguides and filters may be any suitable optically transmissive material including silica, doped silica, glasses, doped glasses and polymers. Polymers are particularly preferred in the practice of this invention because such materials form a basis for highly tunable Bragg gratings, which can cover substantial portions of the standard communications bands. Preferred polymers are those which are photoreactive, such as those described in U.S. Pat. No. 6,306,563, which is hereby incorporated herein by reference in its entirety.

According to an alternative embodiment of the present invention, a hitless wavelength selective optical device is described that includes a first thermo-optic switch (TOS), a second TOS, a first waveguide, a second waveguide, a heating element and a control unit. The first thermo-optic switch (TOS) includes a first, second and third port and the first TOS receives a wavelength division multiplexed (WDM) signal at the first port. The second TOS includes a first, second and third port and the first port of the second TOS provides at least one channel of the WDM signal. The first waveguide is coupled between the second ports of the first TOS and the second TOS. The second waveguide includes a tunable filter formed in the second waveguide that reflects a selected channel from the received WDM signal and is coupled between the third ports of the first TOS and the second TOS. In addition, the second waveguide includes a reference filter formed in the second waveguide that receives a reference signal and provides an indication signal. The filter heating element is in thermal contact with the tunable filter and the reference filter. The control unit is coupled to the filter heating element and varies a temperature of the filter heating element responsive to the indication signal provided by the reference filter to adjust the selected channel of the tunable filter. The control unit also controls the switching of the first TOS and the second TOS such that the received WDM signal is routed through the first waveguide when the temperature of the heating element is adjusted.

Figure 1:
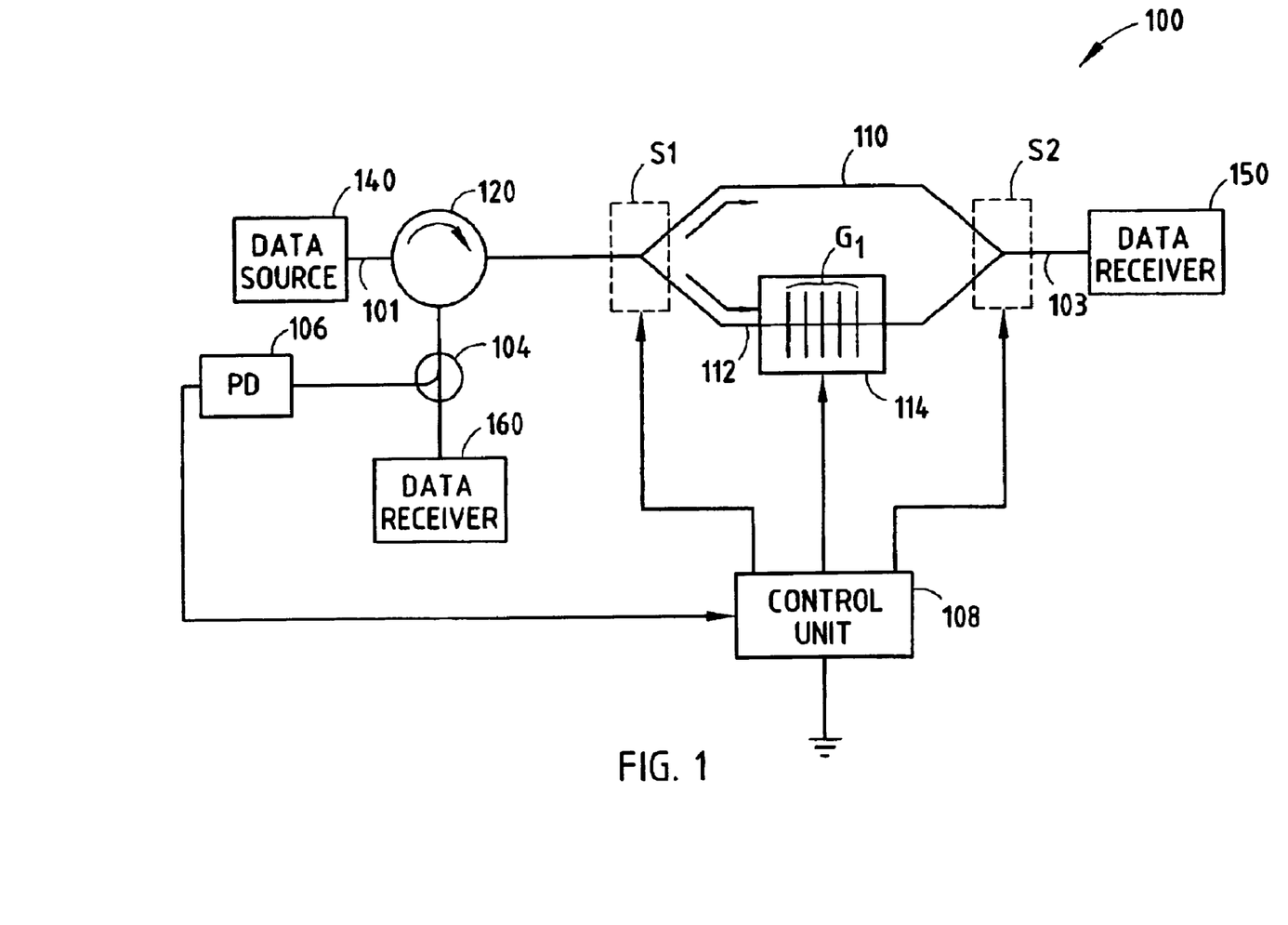
FIG. 1 is an exemplary schematic of an optical system that includes a pair of thermo-optic switches that are coupled to ends of a pair of planar waveguides one of which has a thermally tuned grating.

FIG. 1 schematically depicts an exemplary optical system 100 that includes an optical data source 140 that transmits a wavelength division multiplexed (WDM) signal and is coupled to an optical data receiver 150 by a wavelength selective optical device. In general, the system 100 is hitless (i.e., includes no switching transients) in that a pair of thermo-optic switches S1 and S2 are utilized to route a signal over planar waveguide 110 when the wavelength reflected by grating $G_I$, formed in planar waveguide 112, is to be changed. In order for the device to be hitless during the time that the WDM signals are being switched from waveguide 112 to waveguide 110 and when portions of the signals are traveling in both waveguides, the optical path length (the product of the effective index of the waveguide times the physical length of the waveguide) from S1 through waveguide 110 to S2 must equal the optical path length from S1 through waveguide 112 to S2. If the optical path lengths are identical, the signals will arrive in phase and recombine with no loss. If the optical path lengths differ, a portion of the signal in waveguide 110 may arrive out-of-phase with the portion of the signal in waveguide 112, resulting in destructive interference and loss of part or all of the signal. As is shown, the data source 140 is coupled to a first port of a circulator 120. A second port of the circulator 120 is coupled to a first port of the switch S1. A second port of the switch S1 is coupled to an input of the waveguide 110 and a third port of the switch S1 is coupled to an input of the waveguide 112. An output of the waveguide 110 is coupled to a second port of the switch S2 and an output of the waveguide 112 is coupled to a third port of the switch S2, with a first port of the switch S2 being coupled to the data receiver 150.

A control unit 108 is coupled to a heating element associated with switches S1 and S2, which are formed in a conventional manner, and controls the switches S1 and S2 so as to route an incoming WDM signal along one of the waveguides 110 and 112. The control unit 108 also controls the heating element 114 responsive to an output of a photodetector 106. When switches S1 and S2 are controlled such that the WDM signal is routed along the waveguide 112 and when the control unit 108 has controlled the heating element 114 such that the grating $G_I$ reflects a selected channel, that channel is reflected back to the second port of the circulator 120 and exits a third port (i.e., a drop port) of the circulator 120 into a coupler 104. A portion of the signal (e.g., 1.8 percent) from the coupler 104 is routed to an input of the photodetector 106 with the remaining portion (e.g., 98.2 percent) of the signal being routed to an optical data receiver 160.

In this particular embodiment, the voltage-to-wavelength relationship has been pre-calibrated such that applying a particular signal to the heating element 114 results in the grating $G_I$ reflecting a selected wavelength. It should be appreciated that when no signal is provided by the data source 140, there is no light going through the grating $G_I$ as the system 100 references a source laser line and, as such, the system is not directly tied to the an International Telecommunications Union (ITU) grid. Further, temperature drift may cause the grating $G_I$ to be offset and hit an adjacent channel.

Figure 2:
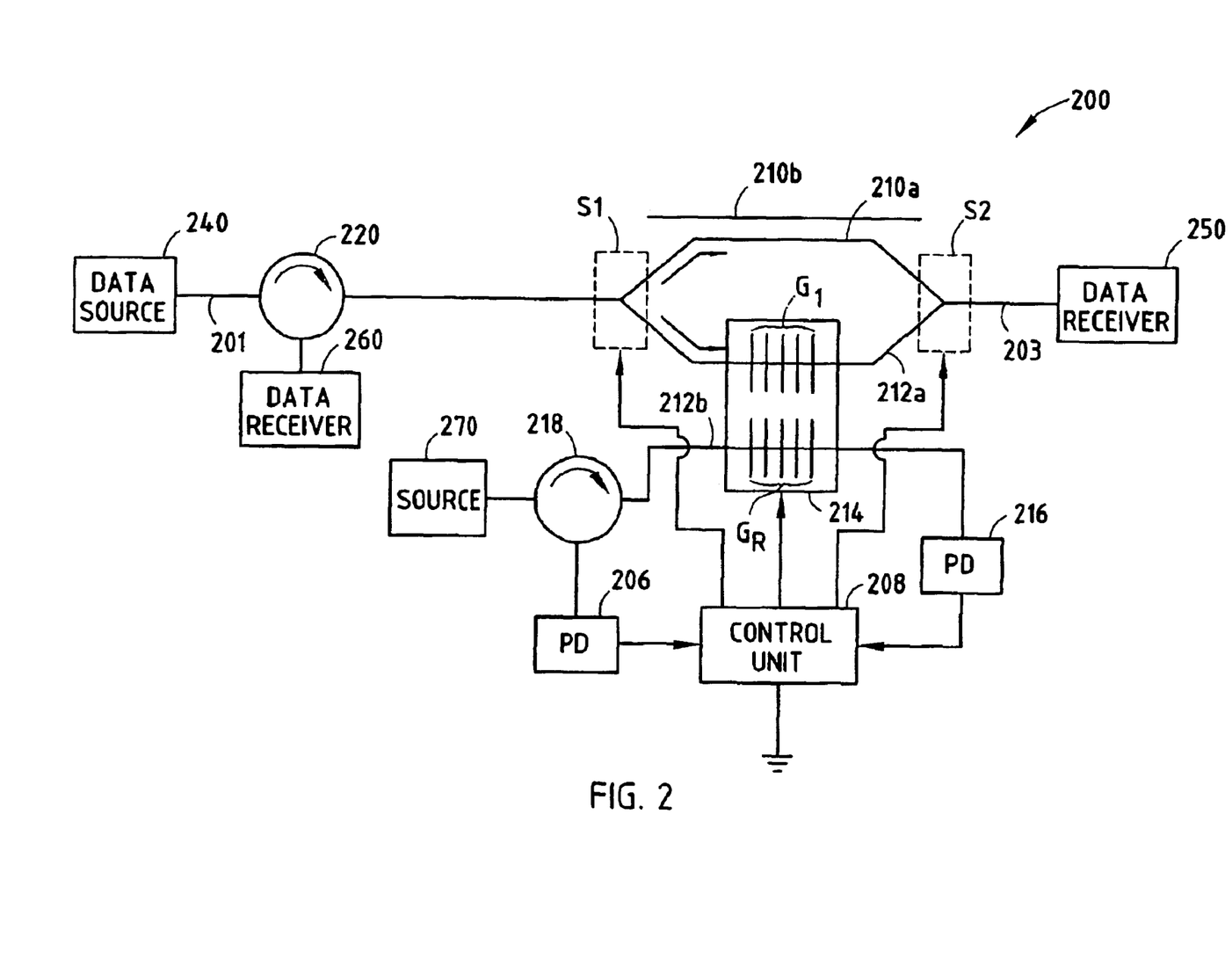
FIG. 2 is an exemplary schematic of an optical system that includes a pair of thermo-optic switches that are coupled to ends of a pair of planar waveguides one of which has a thermally tuned grating and a reference waveguide that includes a reference filter.

FIG. 2 depicts an exemplary optical system 200 that implements a reference waveguide 212b with a reference grating $G_R$ that allows a control unit 208 to better control the wavelength reflected by the grating $G_I$ under various operating conditions. The data source 240 transmits a WDM signal, via a waveguide 201, to a first port of circulator 220. Depending upon the configuration of the system, one of the WDM signals may be provided to an optical data receiver 260, via a third port (i.e., a drop port) of the,circulator 220. A second port of the circulator 220 is coupled to a first port of a thermo-optic switch S1. An input of waveguide 210a is coupled to a second port of the switch S1 and an input of waveguide 212a is coupled to a third port of the switch S1. The waveguide 212a includes a grating $G_I$, which is tuned by the control unit 208, via heating element 214, to reflect a desired channel to the data receiver 260. A dummy waveguide 210b may be provided parallel to the waveguide 210a for symmetry. An output of the waveguide 210a is coupled to a second port of a thermo-optic switch S2 and an output of the waveguide 212a is coupled to a third port of the switch S2. A first port of the switch S2 is coupled to an optical data receiver 250, via a waveguide 203.

The control unit 208 controls the switches S1 and S2 such that when a temperature of the grating $G_I$ is to be switched to reflect a different channel, switching transients are avoided. This is accomplished by controlling switches S1 and S2 such that a received signal is routed over the waveguide 210a. The control unit 208 may be coupled to and receive reference signals from a photodetector 206 that monitors light reflected from a reference grating $G_R$ and a photodetector 216 that monitors light transmitted by the grating $G_R$. Both the photodetector 206 and the photodetector 216 may include appropriate optical filters if a reference source is a broadband source. Examples of optical filters include, for example, bandpass filters, Fabry-Perot filters or filters that have a transmittance that varies approximately linearly with wavelength. Alternatively, only one of the photodetectors 206 and 216 may be implemented. A reference source 270 provides a reference signal to a first port of a circulator 218 and a second port of the circulator 218 is coupled to an input of waveguide 212b, which includes the reference grating $G_R$.

When the photodetector 216 is implemented, an output of the waveguide 212b is coupled to an input of the photodetector 216 and an output of the photodetector 216 is monitored by the control unit 208. A third port of the circulator 218 is coupled to an input of the photodetector 206 such that intensity of a signal reflected form the grating $G_R$ can be monitored by the control unit 208. In operation, the source 270 provides a reference signal to the circulator 218, which is routed to the input of the waveguide 212b. As mentioned above, a signal reflected by the grating $G_R$ is routed back to the second port of the circulator 218, to a third port (i.e., a drop port) of the circulator 218 and to an input of the photodetector 206. The control unit 208 monitors the output of the photodetector 206 to determine when the control signal applied to the heating element 214 is such that the grating $G_R$ is tuned to the wavelength of the reference signal. The control unit 208, based upon pre-calibrated values in a look-up table, provides an appropriate voltage differential by, for example, monitoring one or both the portion of the reference signal reflected from the reference grating $G_R$ and the portion of the reference signal that passes through the reference grating $G_R$. In this manner, the control unit 208 determines an appropriate signal to apply to the heating element 214, based upon the signal that is required for the grating $G_R$ to properly reflect the reference signal. In this manner, the control unit 208 controls the effective refractive index ($n_{eff}$) of the waveguide 212a to lock to a desired channel on the ITU grid and is capable of switching in a hitless manner.

The reference grating $G_R$ may be substantially the same or different from grating $G_I$. The gratings $G_R$ and $G_I$ can be fabricated in sequence, but in the most preferred method they are fabricated simultaneously using, for example, a phase mask. Preferably, the two gratings are parallel and are juxtaposed in a side-by-side position with respect to each other. The distance between the main grating $G_I$ and the reference grating $G_R$ or between the waveguides 212a and 212b must be sufficiently large to prevent the coupling of light from one grating or waveguide to the adjacent one, but in close enough proximity to maintain a nearly identical thermal environment. Preferably, the crosstalk between waveguides or gratings is below −40 dB. The distance between waveguides 212a and 212b or between the center of gratings $G_R$ and $G_I$ preferably lies in a range from about 20 microns to about 1000 microns, more preferably from about 30 microns to about 300 microns, and most preferably from about 50 microns to about 100 microns.

Figures 3A, 3B:
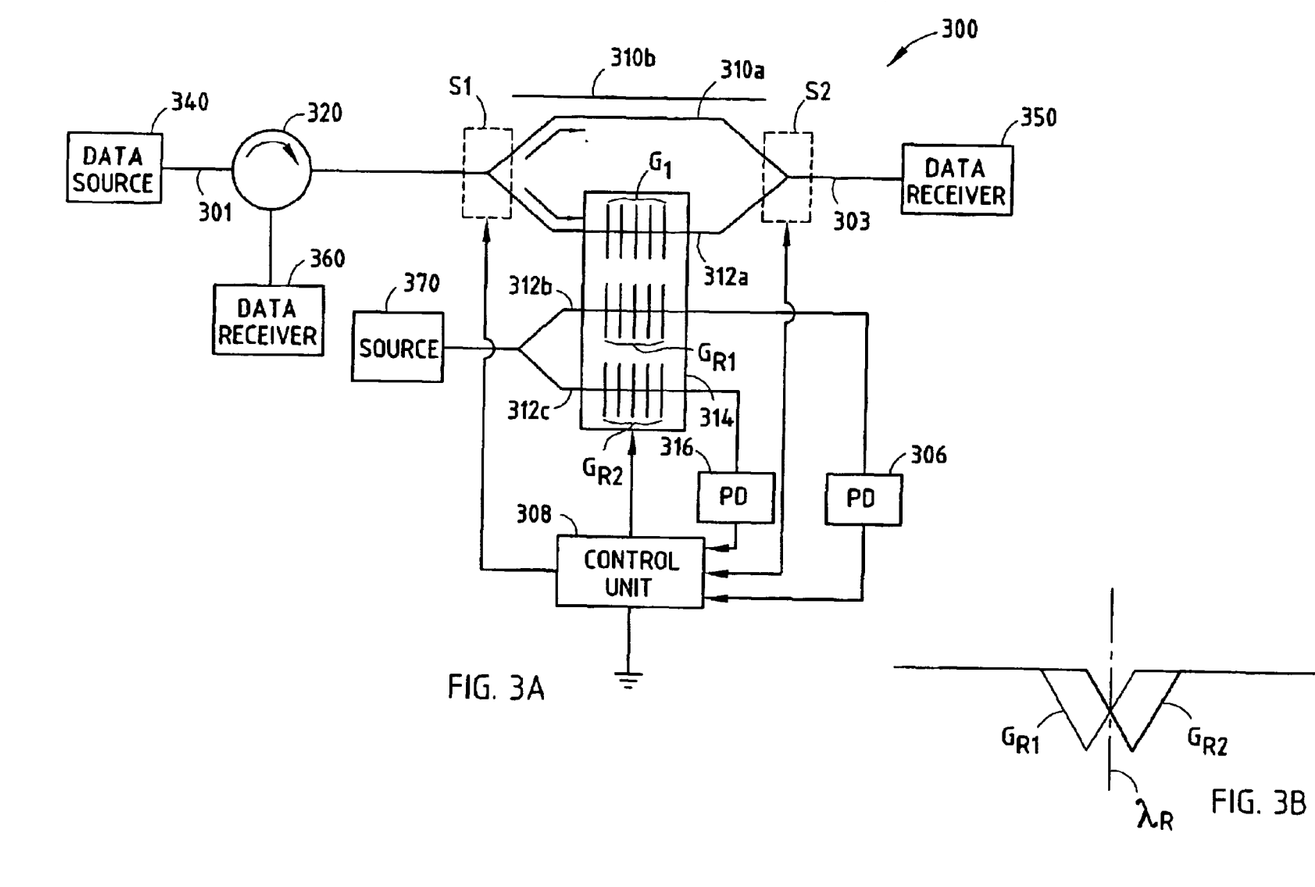
FIG. 3A is an exemplary schematic of an optical system that includes a pair of thermo-optic switches that are coupled to ends of a pair of planar waveguides one of which has a thermally tuned grating and a pair of reference waveguides that each include a reference filter.
FIG. 3B is an exemplary diagram that depicts the relationship of gratings associated with the reference filters of FIG. 3A.

FIG. 3A depicts an exemplary optical system 300, according to another embodiment of the present invention. An optical data source 340 transmits a WDM signal of which one or more channels are provided to an optical data receiver 350 and/or an optical data receiver 360. The data source 340 is coupled, via a waveguide 301, to a first port of a circulator 320 and a second port of the circulator 320 is coupled to a first port of a thermo-optic switch S1, with a third port (i.e., a drop port) of the circulator 320 being coupled to the data receiver 360. A second port of the switch S1 is coupled to an input of a planar waveguide 310a and a third port of the switch S1 is coupled to an input of a planar waveguide 312a, which includes a grating $G_I$. An output of the waveguide 310a is coupled to a second port of a thermo-optic switch S2 and an output of the waveguide 312a is coupled to a third port of the switch S2. A first port of the switch S2 is coupled to the data receiver 350, via a waveguide 303. A dummy waveguide 310b may be implemented for symmetry.

A reference source 370 provides a reference signal to inputs of a pair of waveguides 312b and 312c, which include gratings $G_{R1}$, and $G_{R2}$, respectively. An output of the waveguide 312b is coupled to an input of a photodetector 306, whose output is coupled to a first input of control unit 308. An output of the waveguide 312c is coupled to an input of a photodetector 316, whose output is coupled to a second input of the control unit 308. The control unit 308 is also coupled to a heating element 314 and controls the heating element 314 such that the grating $G_I$, locks onto and reflects a desired wavelength, which is reflected back to the second port of the circulator 320 and to the data receiver 360 in a hitless manner.

The reference source 370 may be a broadband source, a single wavelength or a periodic series of wavelengths. Preferably, the reference source 370 comprises a periodic series of wavelengths $\lambda_1, \lambda_2, \ldots, \lambda_{R-1}, \lambda_R, \lambda_{R+1}, \ldots, \lambda_N$ where N is at least as large as the number of wavelengths utilized in the WDM optical system and where each $\lambda_i$ is centered on an ITU standard wavelength.

Preferably, grating $G_{R1}$ has a center reflection wavelength offset $\Delta\lambda$ to a shorter wavelength than $\lambda_R$ and $G_{R2}$ has a center reflection wavelength offset $\Delta\lambda$ to a longer wavelength than $\lambda_R$. Preferably, a is approximately 10%–90% of the ITU wavelength spacing and, more preferably, $\Delta\lambda$ is approximately 40%–60% of the ITU wavelength spacing. FIG. 3B depicts an exemplary profile for the gratings $G_{R1}$ and $G_{R2}$, which intersect at a reference wavelength $\lambda_R$ and illustrates that the control unit 308 uses the outputs from the waveguides 312b and 312c to equalize light from the two arms (i.e., waveguides 312b and 312c) rather than attempting to control the temperature of the heating element 314 based upon a peak or a valley of one of the gratings $G_{R1}$ and $G_{R2}$.

Figure 4:
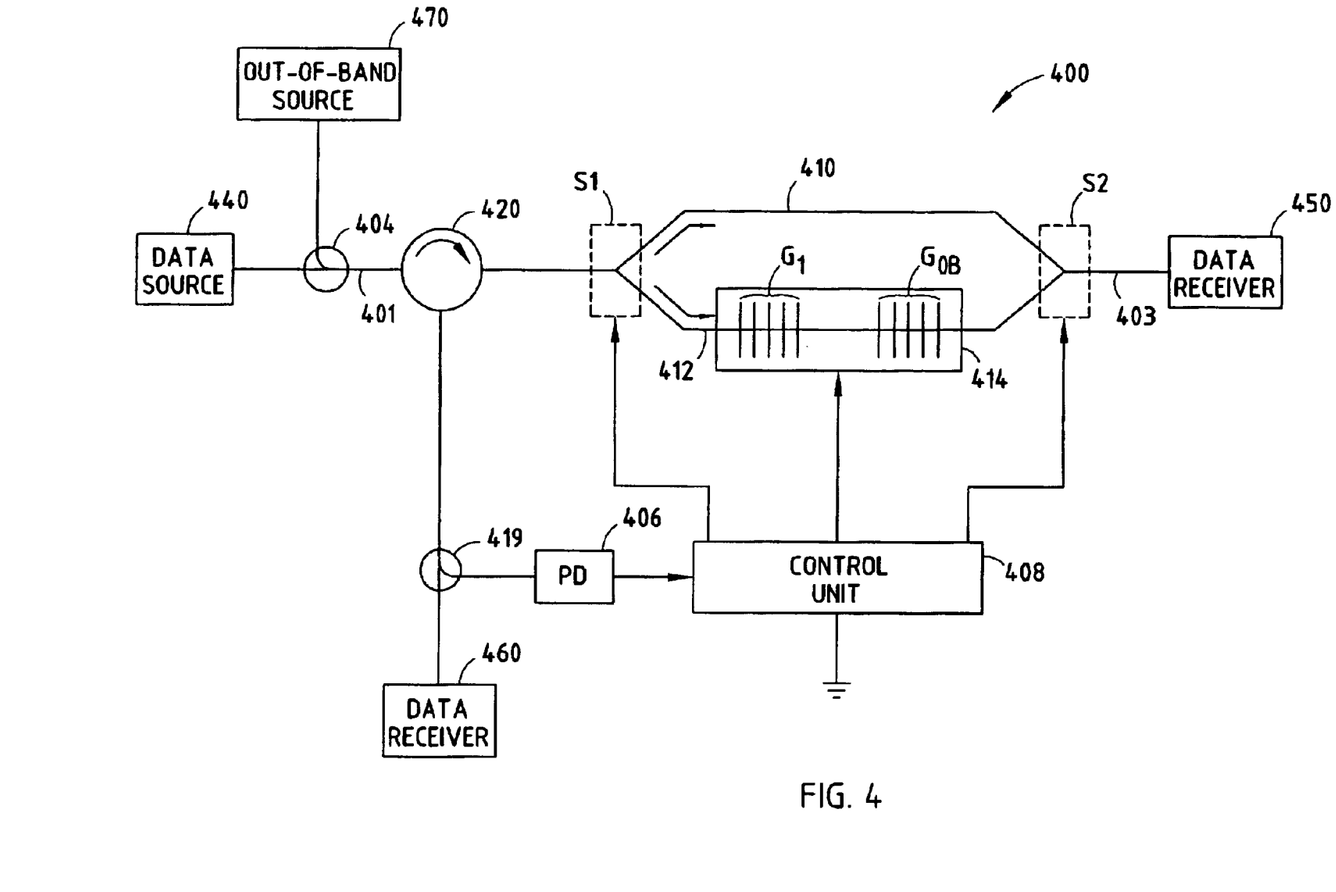
FIG. 4 is an exemplary schematic of an optical system that includes a pair of thermo-optic switches that are coupled to ends of a pair of planar waveguides one of which has a thermally tuned grating and an out-of-band reference grating.

FIG. 4 illustrates an optical system 400 that utilizes an out-of-band grating $G_{OB}$ formed in a planar waveguide 412 along with a grating $G_I$ that is utilized to drop a desired channel. The out-of-band grating reflects light at a wavelength that is outside the wavelength tuning range of the grating $G_I$. While the gratings $G_I$ and $G_{OB}$ are shown formed in the waveguide 412, it should be appreciated that each of the gratings $G_I$ and $G_{OB}$ may be formed in separate serially coupled waveguides. A data source 440 transmits a WDM signal that is provided to a first port of a circulator 420, via a waveguide 401. A second port of the circulator 420 is coupled to a first port of a thermo-optic switch S1. A second port of the switch S1 is coupled to an input of a planar waveguide 410 and a third port of the switch S1 is coupled to an input of the waveguide 412. The waveguide 412 includes the grating $G_I$ that is tuned to reflect an appropriate desired wavelength and the grating $G_{OB}$, which is utilized as a monitor grating, which effectively allows the system 400 to lock onto a desired wavelength even when the waveguide 412 experiences temperature drift.

An output of the waveguide 410 is coupled to a second port of a thermo-optic switch S2 and an output of the waveguide 412 is coupled to a third port of the switch S2. A first port of the switch S2 is coupled to an optical data receiver 450, via a waveguide 403. The third port (i.e., a drop port) of the circulator 420 is coupled to an optical data receiver 460. An out-of-band source 470 is coupled to the waveguide 401, via directional coupler 404, which provides a reference signal to the first port of the switch S1, via the first and second ports of the circulator 420. An input of a photodetector 406 is also coupled, via, for example, a wavelength selective coupler 419, to the third port of the circulator 420. Depending upon the range of wavelengths provided by the source 470, it may be desirable to provide an interference filter at the input of the photodetector 406. An output of the photodetector 406 is coupled to an input of the control unit 408. The control unit 408 includes an output that is coupled to the heating element 414, which is in thermal contact with the gratings $G_I$ and $G_{OB}$.

In operation, the out-of-band source 470 provides a signal through the circulator 420 and into the waveguide 412. Providing the heating element 414 is at an appropriate temperature, the effective refractive index ($n_{eff}$) of the waveguide 412 is such that the grating $G_{OB}$ reflects the out-of-band signal back to the second port of the circulator 420 and the signal is dropped, via a third port of the circulator 420, and is routed to the input of the photodetector 406, via the wavelength selective coupler 419. Based upon the output of the photodetector 406, the control unit 408 then controls the temperature of the heating element 414 such that a desired wavelength is reflected from the grating $G_I$ and dropped to the data receiver 460. Similar to other disclosed embodiments, pre-calibrated difference values may be stored in a look-up table such that the control unit 408 can determine an appropriate signal to apply to the heating element 414 to reflect a desired channel.

Figure 5:
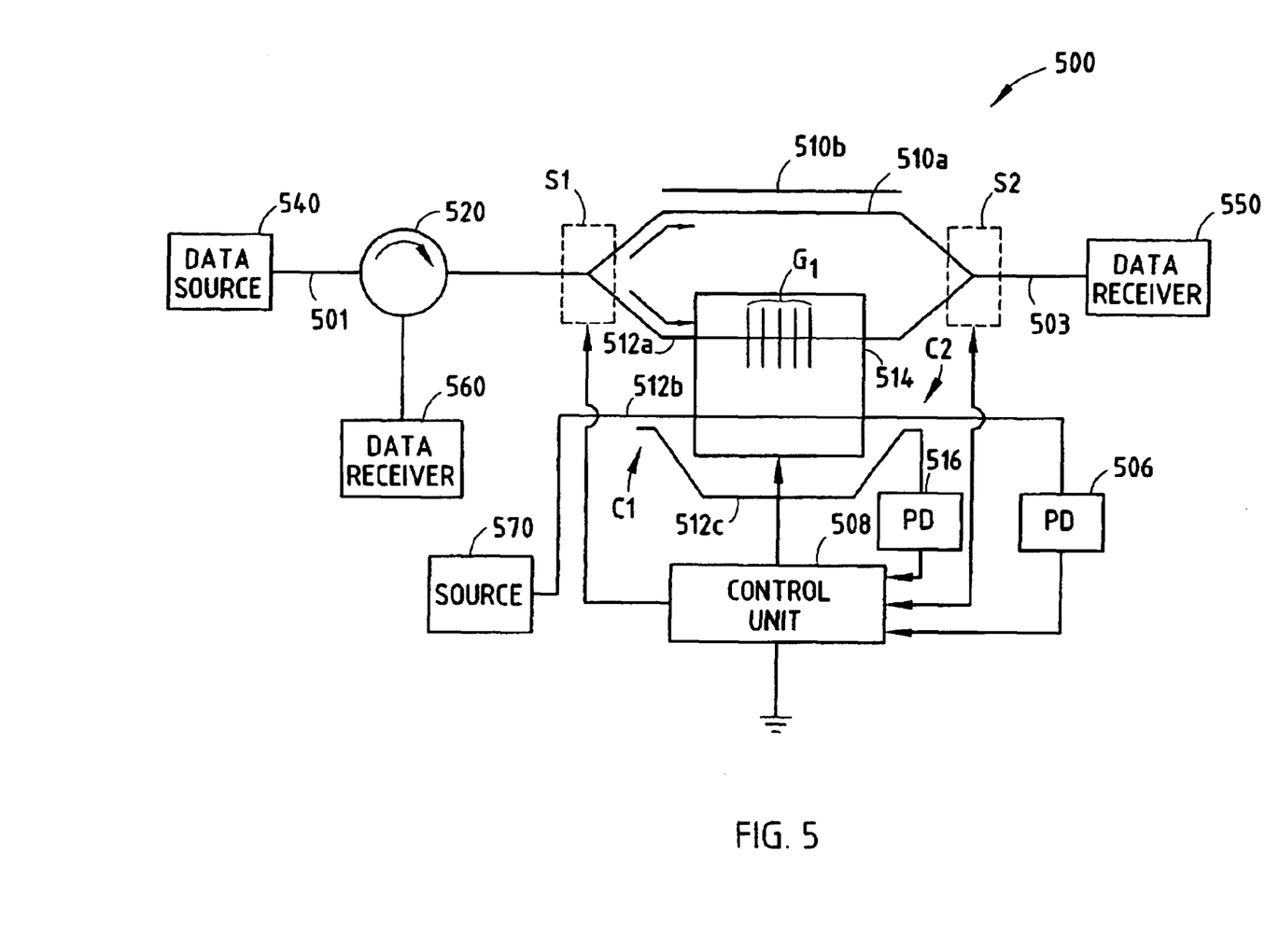
FIG. 5 is an exemplary schematic of an optical system that includes a pair of thermo-optic switches that are coupled to ends of a pair of planar waveguides one of which has a thermally tuned grating and a reference waveguide formed as a Mach-Zehnder interferometer that has one arm sharing the thermal environment of the thermally tuned grating.

FIG. 5 depicts an exemplary optical system 500 that utilizes a Mach-Zehnder interferometer that includes planar waveguides 512b and 512c to monitor the effective refractive index ($n_{eff}$) of waveguide 512a. The system 500 implements thermo-optic switches S1 and S2 such that dropping a channel of a WDM signal, provided by an optical data source 540, is essentially hitless. The data source 540 is coupled to a first port of the circulator 520, via a waveguide 501. A second port of the circulator 520 is coupled to a first port of the switch S1 with a second port of the switch S1 being coupled to an input of a waveguide 510a and a third port of the switch S1 being coupled to an input of a waveguide 512a. An output of the waveguide 510a is coupled to a second port of the switch S2 and the output of waveguide 512a is coupled to a third port of the switch S2. A first port of the switch S2 is coupled to an optical data receiver 550, via a waveguide 503. As shown in FIG. 5, a dummy waveguide 510b may be included for symmetry.

A source 570 provides a reference signal to inputs of a Mach-Zehnder filter, whose arms are formed from waveguides 512b and 512c with couplers C1 and C2. Source 570 is preferably a single wavelength source or a source comprising a narrow band of wavelengths. The couplers C1 and C2 may be, for example, directional couplers or Y-branch splitters. As shown, the heating element 514 is in thermal contact with the grating $G_I$ and the waveguide 512b. Outputs of the waveguides 512b and 512c are monitored by photodetectors 506 and 516, respectively, whose outputs are coupled to separate inputs of the control unit 508. Responsive to the outputs received from the photodetectors 506 and 516, the control unit 508 controls the temperature of the heating element 514 such that the effective refractive index of the waveguide 512a is such that the grating $G_I$ reflects a desired channel to the second port of the circulator 520, which is dropped to an optical data receiver 560, via a third port of the circulator 520.

Figure 6:
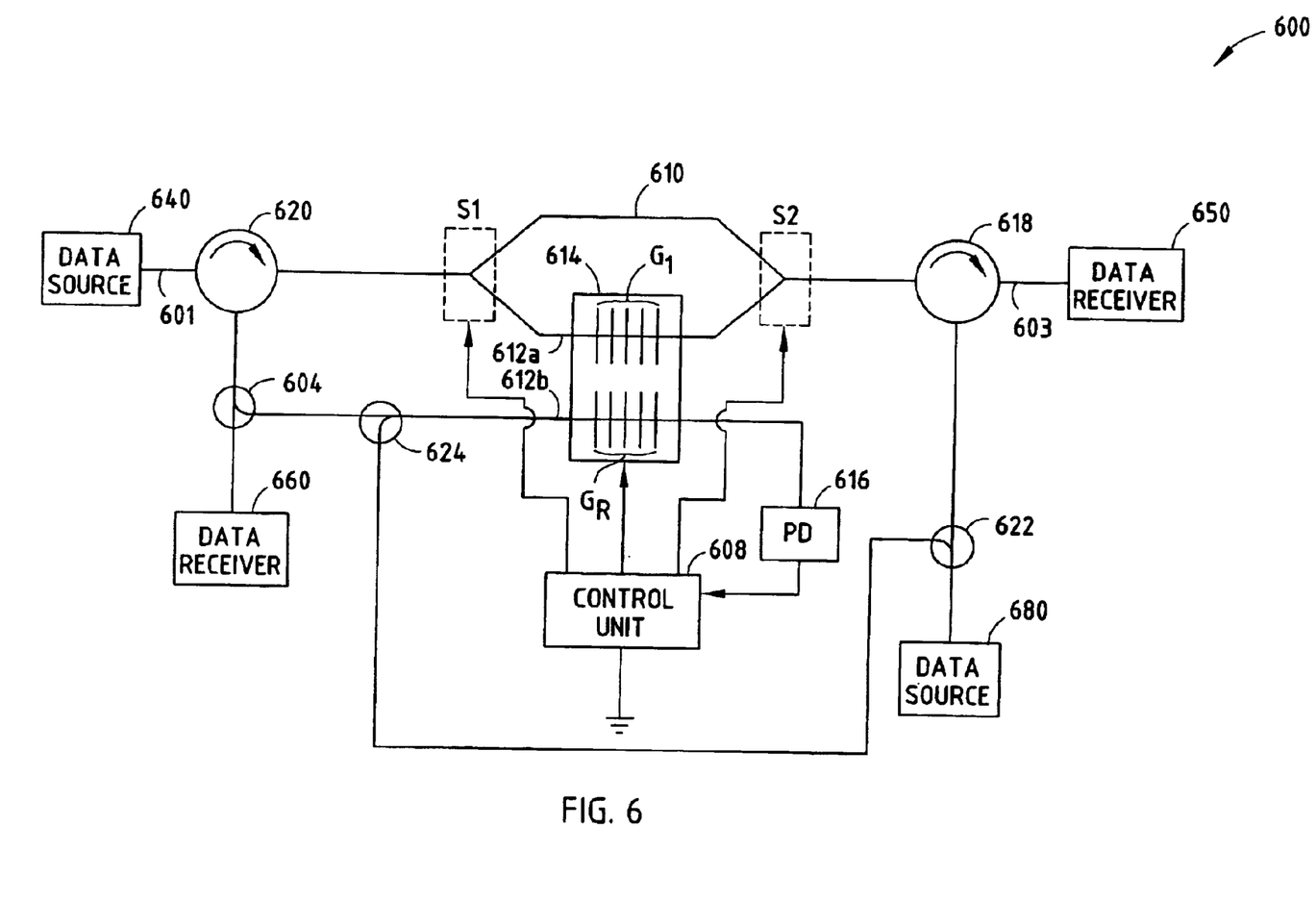
FIG. 6 is an exemplary schematic of an add-drop optical system that includes a pair of thermo-optic switches that are coupled to ends of a pair of planar waveguides one of which has a thermally tuned first grating and an associated reference grating in a third waveguide that shares the thermal environment of the first thermally tuned grating with the third waveguide carrying a portion of the added or dropped signal.

FIG. 6 depicts an optical system 600 that utilizes portions of both add and drop signals as reference signals. An optical data source 640 provides a WDM signal to a first port of circulator 620, via a waveguide 601. A second port of the circulator 620 is coupled to a first port of thermo-optic switch S1 and a second port of the switch S1 is coupled to a planar waveguide 610. A third port of the switch S1 is coupled to an input of a planar waveguide 612a that includes a grating $G_I$. The waveguide 610a is coupled to a second port of thermo-optic switch S2. An output of the waveguide 612a is coupled to a third port of the switch S2 and a first port of the switch S2 is coupled to a first port of circulator 618. A second port of the circulator 618 is coupled to an optical data receiver 650, via a waveguide 603, and a data source 680 provides an add signal to a third port of the circulator 618.

A coupler 622 couples a portion of the add signal to an input of a coupler 624. The portion of the WDM signal reflected from grating $G_I$ of the waveguide 612a is provided to the second port of the circulator 620 and is dropped via a third port of the circulator 620 to an optical data receiver 660. A portion of that signal is provided via a coupler 604 and combined via coupler 624 with a portion of the add signal from coupler 622. The combined add and drop signals provide a reference source to reference grating $G_R$ on waveguide 612b. An output of the waveguide 612b is coupled to an input of a photodetector 616, whose output is coupled to the control unit 618. The control unit 618 is coupled to and controls a temperature of heating element 614, as well as the switches S1 and S2. As previously described with respect to FIGS. 1–5, the control unit 608 also controls the switches S1 and S2 such that changing the wavelength of grating $G_I$ is done in a hitless manner. It may be desirable for the reference grating $G_R$ to have a narrower bandwidth than the main grating $G_I$ as this can lead to higher sensitivity without leading to isolation problems. Accordingly, a number of practical optical systems have been described herein that are capable of maintaining a tunable wavelength filter locked to a desired wavelength and which can switch the tunable wavelength filter from one wavelength to another wavelength in a reliable relatively efficient hitless manner.

It will become apparent to those skilled in the art that various modifications to the preferred embodiment of the invention as described herein can be made without departing from the spirit or scope of the invention as defined by the appended claims.

The invention claimed is:

1. A wavelength selective optical device for locking to a selected channel in an ITU grid in a hitless manner, comprising:

a fist thermo-optic switch (TOS) including a first, second and third port, wherein the first port of the first TOS receives a wavelength division multiplexed (WDM) signal;

a second TOS including a first, second and third port, wherein the first port of the second TOS passes at least one channel of the WDM signal;

a first waveguide coupled between the second ports of the first TOS and the second TOS;

a second waveguide including a tunable filter formed in the second waveguide, the tunable filter reflecting a selected channel from the received WDM signal, wherein the second waveguide is coupled between the third ports of the first TOS and the second TOS;

a third waveguide including a first reference filter formed in the third waveguide, the first reference filter receiving a reference signal and providing an indication signal;

a heating element in thermal contact with the tunable filter and the first reference filter; and a control unit coupled to the heating element, the first TOS and the second TOS, wherein the control unit varies a temperature of the heating element responsive to the indication signal provided by the first reference filter to adjust the selected channel of the tunable filter, and wherein the control unit controls the switching of the first TOS and the second TOS such that the received WDM signal is routed through the first waveguide when the temperature of the heating element is adjusted.

2. The device of claim 1, wherein the tunable filter is a Bragg grating.

3. The device of claim 1, wherein the tunable filter and the first reference filter are Bragg gratings.

4. The device of claim 1, wherein the reference signal is provided by a reference source that is independent of the received WDM signal.

5. The device of claim 4, wherein the indication signal is at least a portion of a transmitted signal passed by the first reference filter.

6. The device of claim 4, wherein the indication signal is at least a portion of a reflected signal reflected by the first reference filter.

7. The device of claim 4, further including:

a fourth waveguide coupled at either end to the third waveguide, wherein the third and fourth waveguides each form an arm of a Mach-Zehnder interferometer, and wherein the indication signal includes a first transmitted signal passed through the third waveguide and a second transmitted signal passed through the fourth waveguide.

8. The device of claim 4, wherein the reference signal is an out-of-band signal and the third waveguide is serially coupled to the second waveguide between the third ports of the first TOS and the second TOS, and wherein the indication signal is at least a portion of a reflected signal reflected by the first reference filter which is an out-of-band filter.

9. The device of claim 4, further including:

a fourth waveguide including a second reference filter, wherein the indication signal includes a first transmitted signal passed through the third waveguide and a second transmitted signal passed through the fourth waveguide.

10. The device of claim 1, wherein the indication signal is at least a portion of a transmitted signal passed by the first reference filter.

11. The device of claim 1, wherein the heating element includes a first heating element for varying the temperature and characteristics of the tunable filter and a second heating element for varying the temperature and characteristics of the first reference filter, and wherein the first and second heating elements are separably controllable.

12. An optical system, comprising:

a wavelength selective optical device for locking to a selected channel in an ITU grid, including:

a first thermo-optic switch (TOS) including a first, second and third port, wherein the first port of the first TOS receives a wavelength division multiplexed (WDM) signal and acts as an input for the wavelength selective optical device;

a second TOS including a first, second and third port, wherein the first port of the second TOS passes at least one channel of the WDM signal and acts as an output for the wavelength selective optical device;

a first waveguide coupled between the second ports of the first TOS and the second TOS;

a second waveguide including a tunable filter formed in the second waveguide, the tunable filter reflecting a selected channel from the received WDM signal, wherein the second waveguide is coupled between the third ports of the first TOS and the second TOS;

a third waveguide including a first reference filter formed in the third waveguide, the first reference filter receiving a reference signal and providing an indication signal;

a heating element in thermal contact with the tunable filter and the first reference filter; and a control unit coupled to the heating element, the first TOS and the second TOS, wherein the control unit varies a temperature of the heating element responsive to the indication signal provided by the first reference filter to adjust the selected channel of the tunable filter, and wherein the control unit controls the switching of the first TOS and the second TOS such that the received WDM signal is routed through the first waveguide when the temperature of the heating element is adjusted;

an optical data source coupled to the input of the wavelength selective optical device, the optical data source providing the WDM signal to the input of the wavelength selective optical device; and an optical data receiver coupled to the output of the wavelength selective optical device for receiving at least one channel of the WDM signal transmitted by the optical data source.

13. The system of claim 12, wherein the tunable filter is a Bragg grating.

14. The system of claim 12, wherein the tunable filter and the first reference filter are Bragg gratings.

15. The system of claim 12, wherein the reference signal is provided by a reference source that is independent of the received WDM signal.

16. The system of claim 15, wherein the indication signal is at least a portion of a transmitted signal passed by the first reference filter.

17. The system of claim 15, wherein the indication signal is at least a portion of a reflected signal reflected by the first reference filter.

18. The system of claim 15, further including:

a fourth waveguide coupled at either end to the third waveguide, wherein the third and fourth waveguides each form an arm of a Mach-Zehnder interferometer, and wherein the indication signal includes a first transmitted signal passed through the third waveguide and a second transmitted signal passed through the fourth waveguide.

19. The system of claim 15, wherein the reference signal is an out-of-band signal and the third waveguide is serially coupled to the second waveguide between the third ports of the first TOS and the second TOS, and wherein the indication signal is at least a portion of a reflected signal reflected by the first reference filter which is an out-of-band filter.

20. The system of claim 15, further including:
a fourth waveguide including a second reference filter, wherein the indication signal includes a first transmitted signal passed through the third waveguide and a second transmitted signal passed through the fourth waveguide.

21. The system of claim 12, wherein the indication signal is at least a portion of a transmitted signal passed by the first reference filter.

22. The system of claim 12, wherein the heating element includes a first heating element for varying the temperature and characteristics of the tunable filter and a second heating element for varying the temperature and characteristics of the first reference filter, and wherein the first and second heating elements are separably controllable.

23. A wavelength selective optical device for locking to a selected channel in an ITU grid in a hitless manner, comprising:
a first thermo-optic switch (TOS) including a first, second and third port, wherein the first port of the first TOS receives a wavelength division multiplexed (WDM) signal;
a second TOS including a first, second and third port, wherein the first port of the second TOS passes at least one channel of the WDM signal;
a first waveguide coupled between the second ports of the first TOS and the second TOS;
a second waveguide including a tunable filter formed in the second waveguide, the tunable filter reflecting a selected channel from the received WDM signal, wherein the second waveguide is coupled between the third ports of the first TOS and the second TOS;
a third waveguide including a first reference filter formed in the third waveguide, the first reference filter receiving a reference signal and providing an indication signal, wherein the tunable filter and the first reference filter are Bragg gratings;
a heating element in thermal contact with the tunable filter and the first reference filter; and
a control unit coupled to the heating element, the first TOS and the second TOS, wherein the control unit varies a temperature of the heating element responsive to the indication signal provided by the first reference filter to adjust the selected channel of the tunable filter, and wherein the control unit controls the switching of the first TOS and the second TOS such that the received WDM signal is routed through the first waveguide when the temperature of the heating element is adjusted.

24. The device of claim 23, wherein the reference signal is provided by a reference source that is independent of the received WDM signal.

25. The device of claim 24, wherein the indication signal is at least a portion of a transmitted signal passed by the first reference filter.

26. The device of claim 24, wherein the indication signal is at least a portion of a reflected signal reflected by the first reference filter.

27. The device of claim 24, further including:
a fourth waveguide coupled at either end to the third waveguide, wherein the third and fourth waveguides each form an arm of a Mach-Zehnder interferometer, and wherein the indication signal includes a first transmitted signal passed through the third waveguide and a second transmitted signal passed through the fourth waveguide.

28. The device of claim 24, wherein the reference signal is an out-of-band signal and the third waveguide is serially coupled to the second waveguide between the third ports of the first TOS and the second TOS, and wherein the indication signal is at least a portion of a reflected signal reflected by the first reference filter which is an out-of-band filter.

29. The device of claim 24, further including:
a fourth waveguide including a second reference filter, wherein the indication signal includes a first transmitted signal passed through the third waveguide and a second transmitted signal through the fourth waveguide.

30. The device of claim 23, wherein the indication signal is at least a portion of a transmitted signal passed by the first reference filter.

31. The device of claim 23, wherein the heating element includes a first heating element for varying the temperature and characteristics of the tunable filter and a second heating element for varying the temperature and characteristics of the first reference filter, and wherein the first and second heating elements are separably controllable.

\* \* \* \* \*